(12) United States Patent
Baz et al.

(10) Patent No.: US 10,300,313 B2
(45) Date of Patent: May 28, 2019

(54) HEAT AND FIRE PROTECTIVE ITEMS

(71) Applicant: University of Maryland, College Park Office of Technology Commercialization, College Park, MD (US)

(72) Inventors: Amr M. Baz, Rockville, MD (US); Marino diMarzo, Bethesda, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 1294 days.

(21) Appl. No.: 13/836,099

(22) Filed: Mar. 15, 2013

(65) Prior Publication Data
US 2013/0239308 A1    Sep. 19, 2013

Related U.S. Application Data

(60) Provisional application No. 61/612,028, filed on Mar. 16, 2012.

(51) Int. Cl.
*B32B 5/26* (2006.01)
*A41D 31/00* (2019.01)
*A62B 17/00* (2006.01)

(52) U.S. Cl.
CPC ........ *A62B 17/003* (2013.01); *A41D 31/0027* (2013.01); *B32B 5/26* (2013.01)

(58) Field of Classification Search
CPC ............ A41D 31/0022; A41D 31/0027; Y10T 29/49801; Y10T 29/49863; Y10T 29/49865; Y10T 29/49906; B32B 5/26; B32B 5/028; B32B 5/06; B32B 9/041; B32B 15/043; B32B 15/14; B32B 2305/34; B32B 2307/30; B32B 2307/304; B32B 2307/3065; B32B 2307/51;
(Continued)

(56) References Cited

U.S. PATENT DOCUMENTS

| 5,468,537 A | 11/1995 | Brown et al. |
| 2008/0189840 A1* | 8/2008 | Knoff ................. A41D 31/0027 2/458 |

(Continued)

FOREIGN PATENT DOCUMENTS

| EP | 2 481 311 A2 | 1/2012 |
| WO | 99/05926 | 2/1999 |
| WO | WO 2008044815 A1 * | 4/2008 ........... A62B 17/005 |

*Primary Examiner* — Jason L Vaughan
(74) *Attorney, Agent, or Firm* — Squire Patton Boggs (US) LLP

(57) ABSTRACT

A method and devices are described, in which a transformable fiber at a first crystal structure is shaped from its pre-determined configuration into a new shaped configuration. The new shaped configuration of the transformable fiber is inserted into a cavity of a heat and fire protective item. The new shaped configuration of the transformable fiber is heated to above its transformation temperature to a second crystal structure. The heating transforms the new shaped configuration to its pre-determined configuration, wherein the pre-determined configuration forms an air pocket within the heat and fire protective item. The transformable fiber is cooled below its transformation temperature to revert the transformable fiber back to the new shaped configuration at the first crystal structure.

6 Claims, 8 Drawing Sheets

(58) Field of Classification Search
CPC ........ B32B 2307/704; B32B 2307/738; B32B 2311/18; B32B 2311/22; B32B 2437/00; B32B 2437/02; B32B 2437/04; A62B 17/003; B23B 2571/00; B23B 2571/02
See application file for complete search history.

(56) References Cited

U.S. PATENT DOCUMENTS

2013/0157039 A1\* 6/2013 Browne ................. B60R 13/08
 428/313.9
2013/0174334 A1\* 7/2013 Kuroda .............. A41D 31/0027
 2/455

\* cited by examiner

| Alloy | Composition | Range of transformation temperatures (As) °C | Transformation hysteresis, °C |
|---|---|---|---|
| AgCd | 44 ~40 at %Cd | -190 ~50 | ~15 |
| AuCd | 46.5~50 at %Cd | 30~100 | ~15 |
| CuAlNi | 14~14.5 wt % Al  3 ~4.5 wt % Ni | -140~100 | ~35 |
| CuSn | ~15 at % X | -120~30 | |
| CuZn | 38.5~41.5 wt % Zn | -180~ -10 | ~10 |
| CuZn X (X=Si,Sn,Al) | small wt % X | -180~200 | ~10 |
| InTl | 18~23 at %Tl | 60~100 | ~4 |
| NiAl | 36~38 at % Al | -180~100 | ~10 |
| TiNi | 46.2~51 at % Ti | -50 ~110 | ~30 |
| TiNi X (X=Pd,Pt) | 50 at % Ni+X  5~ 50 at % X | -200~700 | ~100 |
| TiNiCu | ~15 at % Cu | -150~100 | ~50 |
| TiNiNb | ~15 at % Nb | -200~50 | ~125 |
| TiNiAu | 50 at % Ni+Au | 20~610 | |
| TiPd X (X=Cr,Fe) | 50 at % Pd+X  ~15 at % X | 0~600 | ~50 |
| MnCu | 5~35 at % Cu | -250~180 | ~25 |
| FeMnSi | 32 wt%Mn, 6Wt%Si | -200~150 | ~100 |
| FePt | ~25 at % Pt | ~-130 | ~4 |
| FePd | ~30 at % Pd | ~50 | |
| FeNi X (X=C,Co,Cr) | small wt % X | | |

FIG. 3

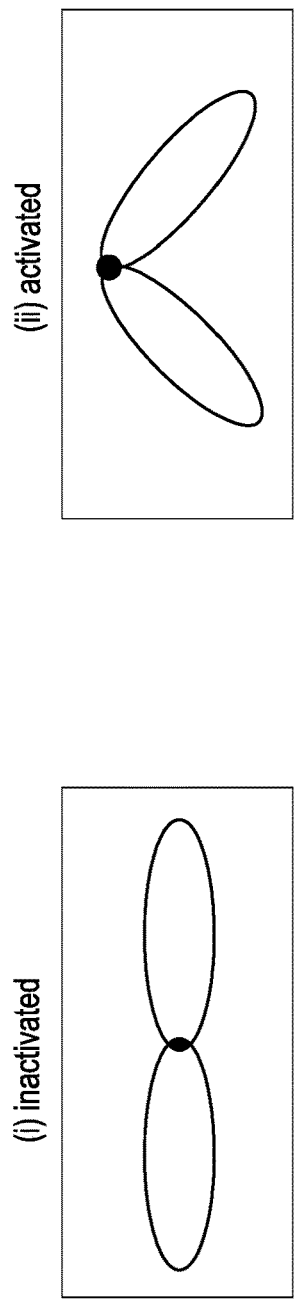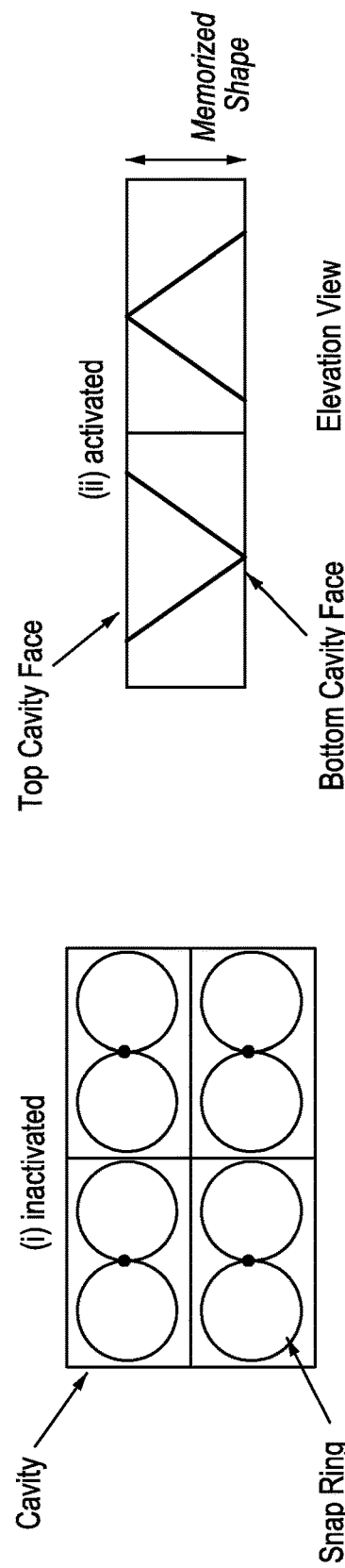
FIG. 4

HEAT AND FIRE PROTECTIVE ITEMS

CROSS REFERENCE TO RELATED APPLICATIONS

This application claims priority to U.S. Provisional Patent Application No. 61/612,028 filed Mar. 16, 2012, which is incorporated by reference herein in its entirety.

GOVERNMENT LICENSE RIGHTS

This invention was made with government support under EMW2008FP00653 awarded by Department of Homeland Security. The government has certain rights in the invention.

BACKGROUND

Field

This invention relates to heat and fire protective items, and in particular, to garments and gear that are protective from fire and excessive heat.

Description of the Related Art

Protective garments are used in applications, such as firefighting, law enforcement, military, or industry, where protection of the wearer against heat or flames is required. The protective garment needs to provide a significant degree of thermal insulation against flames and heat, and to suppress heat transfer through the garment from the outside to the inside. The garment also needs to allow some degree of moisture transfer, or breathability through the garment from the inside to the outside. In addition, the protective garment needs to be functional and sufficiently comfortable for the wearer to perform his/her duties.

A protective garment for a firefighter requires sufficient thermal insulation when the firefighter is exposed to flashover of flames where temperatures may reach up to 1000° C. The outer shell of the protective garment is expected to protect the wearer at temperatures up to 350° C. when he/she needs to approach flames closely. However, the interior of the garment next to the wearer's skin should not exceed 38° C.

A known firefighter's protective garment uses intumescent materials. An intumescent substance has a polymer resin-expandable graphite mixture positioned between a flame barrier layer and a liquid-proof barrier layer. At an activation temperature of about 200° C., the volume of the intumescent substance increases. After exposure to about 300° C., the volume increases to about 200%. The intumescent material can be manufactured as discrete guard plates affixed to an outer surface of a flexible fabric. The guard plates expand upon exposure to sufficient heat to provide a continuous thermal insulating and flame retardant outer shell film. The guard plates may also include microcapsules filled with water or a water-based solution that evaporates upon exposure to heat. However, this approach has limitations when applied to fabric and requires a high activation temperature.

Another known firefighter's garment includes multiple cavities filled with a gas generating agent that becomes activated upon reaching its activation temperature. The gas-filled cavities reside between two or more laminar layers. The gas within the cavities expands to provide an insulation layer. However, a gas cavity becomes inoperable if the garment is torn or poked in the area of the gas cavity.

SUMMARY

In an embodiment, a fire protective item comprises a body garment that is designed to at least partially cover a human body. One or more cavities are situated within the body garment. One or more transformable fibers are situated within the associated one or more cavities, wherein the one or more transformable fibers contain a first crystal structure at a first temperature and transform to a second crystal structure at a second temperature.

Another embodiment comprises a method in which a transformable fiber at a first crystal structure is shaped from its pre-determined configuration into a new shaped configuration. The new shaped transformable fiber is inserted into a cavity of a fire protective item. The new shaped configuration of the transformable fiber is heated to above its transformation temperature to a second crystal structure. The heating transforms the new shaped configuration to its pre-determined configuration, wherein the pre-determined configuration forms an air pocket within the fire protective item. The transformable fiber is cooled below its transformation temperature to revert the transformable fiber back to the new shaped configuration at the first crystal structure.

In another embodiment, a fire protective item includes a thermally insulated blanket. A plurality of cavities are located throughout the thermally insulated blanket. A plurality of shape memory fibers (SMFs) are impregnated within the associated plurality of cavities. The plurality of SMFs are transformed from a first crystal structure to a second crystal structure when heated to a temperature above a transformation temperature of the plurality of shape memory fibers.

BRIEF DESCRIPTION OF THE DRAWINGS

For proper understanding of the invention, reference should be made to the accompanying drawings, wherein:

FIG. 3 is a table illustrating SMF materials according to embodiments of the invention;

FIG. 4 is an illustration of different SMF configurations according to embodiments of the invention;

DETAILED DESCRIPTION

Embodiments of the invention include heat and fire protective items, such as heat and fire protective fabric, gear, and garments. These fire protective items protect the wearer from flames and excessive heat. Heat and fire protective items include, but are not limited to a coverall garment, head and neck gear, a blanket, and gloves. Wearers of these protective items include, but are not limited to firefighters, police, military personnel, industry workers such as steel workers and power station boiler workers, and victims stranded in a blaze-stricken area.

Embodiments of the invention include heat and fire protective items to mitigate burns and manage the heat transport inside the garment, fabric, or gear. A set of shape memory fibers (SMFs) are inter-woven with the fabric of the heat protective item. Another embodiment provides cavities within the fabric, in which the SMFs reside. The SMFs are passively activated whenever excessive thermal exposures are detected, based upon the unique phase transformation characteristic of the particular fiber used. Once the SMFs are activated, they introduce air pockets inside the fabric or cavities, which reduce the thermal conductivity of the protective item and hence, eliminate or reduce the possibilities of burns. The stacking and placement of SMFs are optimally determined in order to enhance the performance of the heat and fire protective item and thereby ensure burn mitigation and safety of the wearer.

Figure 1:
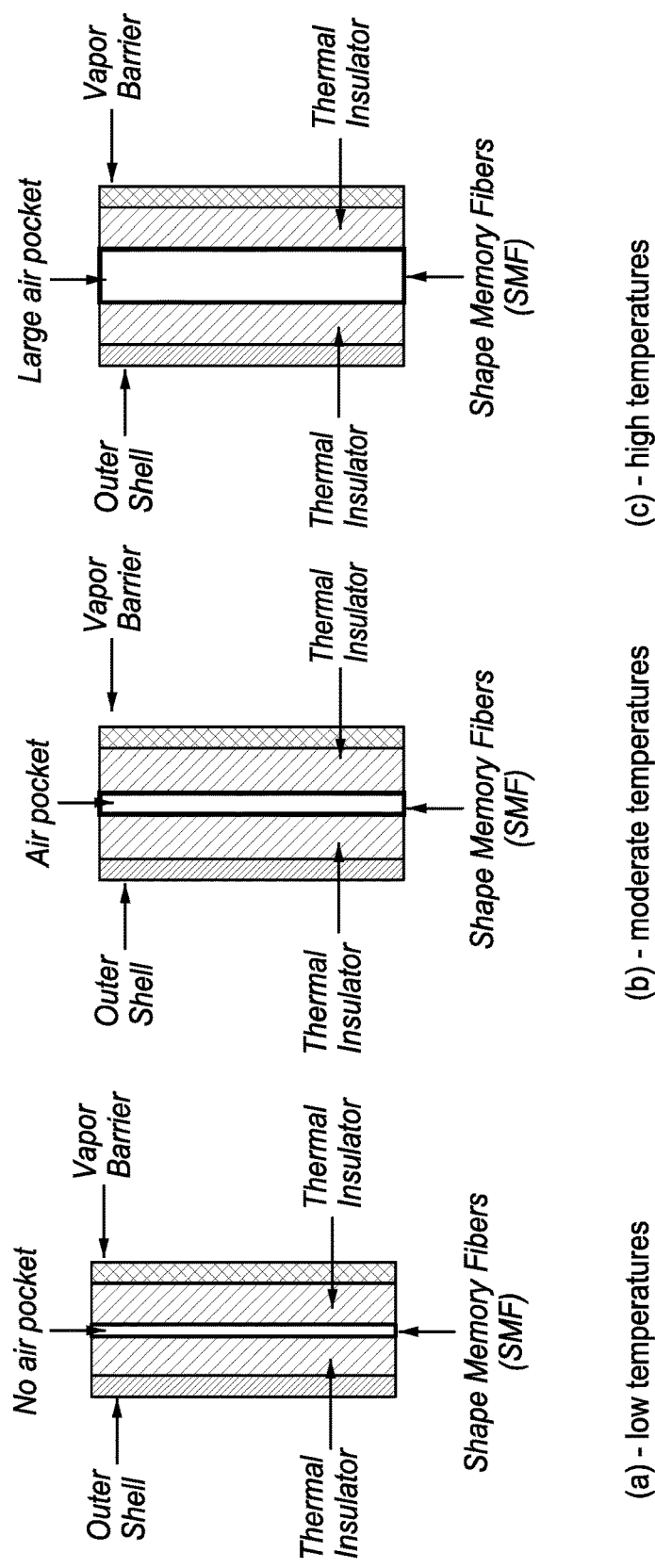
FIG. 1 is an illustration showing how SMFs respond to an increase in temperature according to embodiments of the invention.

FIG. 1 illustrates how SMFs respond to an increase in temperature according to embodiments of the invention. SMFs are placed between two thermal insulator layers. An outer shell layer is placed on the exterior surface of one of the thermal insulator layers, and a vapor barrier layer is placed on the interior surface of the other thermal insulator layer. At low temperatures, as illustrated in FIG. 1(a), there is little to no air pocket within the SMFs. At moderate temperatures, illustrated in FIG. 1(b), the SMFs have expanded some to increase the air pocket region. At high temperatures, illustrated in FIG. 1(c), a large air pocket region exists within the SMFs.

The expansion of the air pocket illustrated in FIG. 1 occurs by the SMFs undergoing a phase transformation upon exposure to increased heat. The particular phase transformation temperature will depend upon the material of the fibers. As an example for illustrative purposes only, SMFs comprised of a nickel/titanium alloy will have a transformation temperature in the range of −50° C. to 110° C. Some SMFs have a transformation temperature of 65-75° C., resulting in a complete activation temperature as high as 100° C. However, this would be an unacceptable and possibly dangerous temperature against the skin of the wearer. A specific transformation temperature can be established by varying the concentration of nickel to titanium. For purposes of heat and fire protective items, a nickel to titanium concentration may be selected with a transformation temperature of approximately 50° C., resulting in a safe and comfortable temperature for the wearer. Depending upon the particular heat and protective item, other preferred transformation temperatures may be selected.

The SMFs can have a wire diameter thickness ranging from 0.008-0.040 inches. For purposes of heat and fire protection, a wire thickness of approximately 0.030 inches has certain advantages. A larger diameter wire, such as 0.030 inches is capable of generating a much greater force, which allows the air pockets to be easily created. The larger diameter wire also allows a much larger deflection, thereby creating a larger air pocket and more effective thermal isolation.

Figure 2:
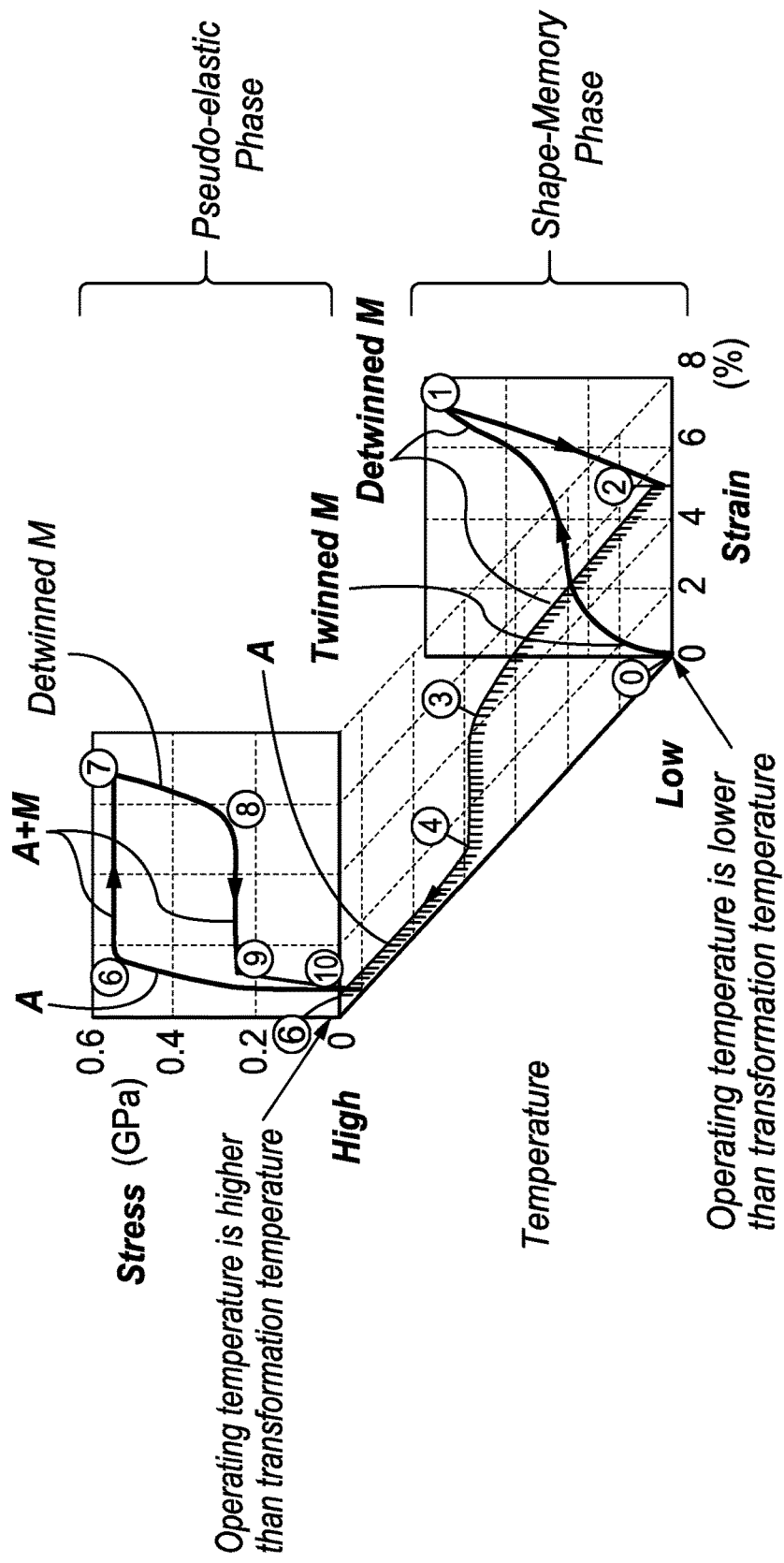
FIG. 2 is an illustration showing different phases that a nickel/titanium SMF will undergo upon exposure to increased heat.

FIG. 2 illustrates the two different phases that a nickel/titanium SMF will undergo upon exposure to increased heat. Several SMF materials can be used in addition to nickel/titanium. FIG. 3 is a table illustrating several other SMF materials, along with their associated transformation temperature ranges and a transformation hysteresis temperature. With reference back to FIG. 2, two stress-strain curves along the y- and x-axes, respectively are illustrated. A temperature range is also illustrated along the z-axis.

The front stress-strain curve illustrates the properties of a nickel/titanium alloy at a low operating temperature range, such as a temperature range experienced away from extensive heat or flames. This low operating temperature is below the transformation temperature of the nickel/titanium alloy. The nickel/titanium alloy exhibits a shape-memory phase at the low operating temperature range. This shape-memory phase is also known as a martensite phase or martensite crystal structure. The low yield strength shape-memory phase refers to the ability of the SMFs to return to a pre-determined, or trained shape when heated. As illustrated in the front stress-strain curve of FIG. 2, the material can be deformed into another shape (point 1 on the front curve) with relatively little force. The new shape is retained after the stress has been removed (point 2 on the front curve), as long as the material is kept below its transformation temperature.

When the material is heated to its transformation temperature, the material moves from the martensite phase (point 3 on the temperature curve) to an austenite phase (point 4 on the temperature curve). This temperature at which the nickel/titanium material changes from a martensite phase to an austenite phase is known as its transformation temperature. The specific transformation temperature depends upon the material or alloy used and the concentration of the alloy materials.

After reaching the transformation temperature, the SMF material enters into a pseudo-elastic phase, as illustrated by the rear stress-strain curve of FIG. 2. The SMF material operates at a temperature above its transformation temperature at this phase (point 5 on the rear stress-strain curve). The rear stress-strain curve illustrates that a stress can be applied (point 6 on the rear curve) to cause a strain or change in shape (point 7 on the rear curve). However, as soon as the stress is removed (point 8 on the rear curve), the material reverts back to its original shape (points 9 and 10 on the rear stress-strain curve). This unique phase transformation phenomenon, from martensite to austenite during heating and back to martensite during cooling, is harnessed to provide control of air pockets inside a heat and fire protective item.

FIG. 4(a) illustrates a snap-ring SMF configuration and FIG. 4(b) illustrates a grid snap-ring SMF configuration, both of which can be used with a heat and fire protective item to provide enhanced heat and flame protection for the wearer. The size and configuration of the SMFs will be determined by such factors as the size and purpose of the fire protective item. For example, a firefighter's coverall garment will have various cavities filled or impregnated with SMFs situated and anchored throughout the garment. The cavities need to account for the shape and size of the SMFs before and after activation of the transformable fibers.

The SMF wires undergo a heat treatment process to form an initial pre-determined configuration, such as the snap ring configurations illustrated in FIG. 4. An example heat treatment process includes heating the SMF wires at the desired configuration to approximately 500° C., holding at that temperature for ten minutes, then quenching in cold water. This process is repeated several times (e.g. twenty times) to impart the correct shape training profiles.

When SMF wires are heated just once and left to cool in ambient air, the wires lose their memory rather quickly and are no longer effective. In extreme situations, such as a firefighting scenario, the SMF wires may reach 100° C. As a result, SMF wires that are treated with this process may become liquid and begin to flow. This would clearly create a dangerous situation.

As illustrated in FIG. 4(a), the transformable fibers are shaped to have a flat or 2-D configuration before activation. The transformable fibers maintain this configuration when the heat and fire protective item is not exposed to heat or flames. After the protective item is exposed to heat above the transformation temperature of the transformable fibers, the fibers will activate to their pre-determined/trained state. The activated state is a 3-D configuration, which allows air to flow through the network of fibers. In the grid snap-ring SMF configuration of FIG. 4(b), some rings will move up when activated, while all neighboring rings will move downward. This results in multiple and equi-distant support points that push evenly on the top and bottom faces of the cavity of the protective item. When the heat is removed and the fibers fall to a temperature below the transformation temperature, the fibers will return to the flat 2-D configuration of FIG. 4(a).

The snap-ring configurations illustrated in FIG. 4 remain stationary and functional within the cavities of the protective item during activation and operation, as well as washing of the protective item. Some SMF configurations, such as helical springs, tend to bend and coalesce with use.

The individual SMF size and configuration will vary with the location of the SMFs within the garment. The SMFs can be secured within the garment in various ways, such as woven into the fabric of the garment or anchored within a cavity of the garment and secured by a zipper, Velcro™, buttons, snaps, or hooks. Any way in which the SMFs can be secured and allowed to expand within the protective item upon an increase in temperature is contemplated by embodiments of the invention.

A specific example in which the placement of SMFs within cavities of a firefighter's jacket is given for illustrative purposes only. The arm and shoulder areas may each contain ten cavities for a total of twenty cavities within the jacket. More specifically, the jacket may contain four cavities on each shoulder and six cavities along the top portion of each arm. Several other combinations for the location and number of cavities for containment of SMFs are contemplated by embodiments of the invention.

The size of each cavity can vary, depending upon the particular garment or protective item. In a specific example with reference to the firefighter's jacket, a cavity size of approximately 40 mm depth has certain advantages. A larger depth cavity, such as 40 mm can accommodate a larger-sized SMF wire configuration, such as that illustrated in FIGS. 4(a) and 4(b). In the SMF snap-ring configurations, one ring is anchored to an adjacent ring, which produces the 3-D activated configuration. However, the SMF snap-ring configuration is still allowed to move within the cavity, relative to the material of the garment. This allows the garment to remain free from bunching and wrinkling. When the SMF wire configuration is activated, the larger-sized wire configuration will deflect more than a smaller-sized configuration, thereby providing a larger volume of air flow (i.e. an enhanced thermal isolation) and a stiff configuration. In addition, this allows the use of a larger diameter-sized SMF wire, such as 0.020-0.040 inches in diameter. The larger diameter-sized wire is capable of generating a much greater force, which allows the air pockets to be easily created.

In contrast to the snap-ring configurations discussed above, a spring SMF configuration has several disadvantages. A larger-sized wire diameter in a spring configuration will actually reduce the amount by which the spring configuration can deflect, rather than increase the amount of deflection. For example, a spring configuration with a 0.011 inch diameter wire can deflect approximately 19 mm, whereas a 0.020 inch diameter wire will have a deflection of approximately 10 mm. Therefore, using larger-sized diameter wires in a spring configuration will reduce the amount of deflection, thereby reducing the thermal isolation. In addition, when the spring configuration is activated in the diameter direction, the spring will shrink in the longitudinal direction. This will cause shrinking and wrinkling of the garment in the longitudinal direction of the spring.

Another embodiment of the invention for a heat and fire protective item includes head or neck gear. The head covering and neck covering could be two separate items, or they could be combined into a single item. The neck covering could also be integrated with a hard hat, such as that worn by a firefighter. The SMFs for a head covering and a neck covering would likely be smaller in size so that the protective item would conform to the shape of the head and neck.

The above embodiments for a heat and fire protective coverall garment and the head and neck gear can be used by members of the military, police, and industry, as well as firefighters. Industry workers that would benefit from the heat and fire protective items described herein include steel workers who work near furnaces and power station workers who work near boilers. However, a heat and fire protective item in which protection is needed against heat or flames for any other role or purpose is contemplated by embodiments of the invention.

Still another embodiment of the invention for a heat and fire protective item includes a blanket or other item that can be wrapped about a person. As an example for illustrative purposes only, a heat and fire protective blanket could be used by a victim that is stranded in a heated or blaze-stricken environment while awaiting assistance.

Figure 5:
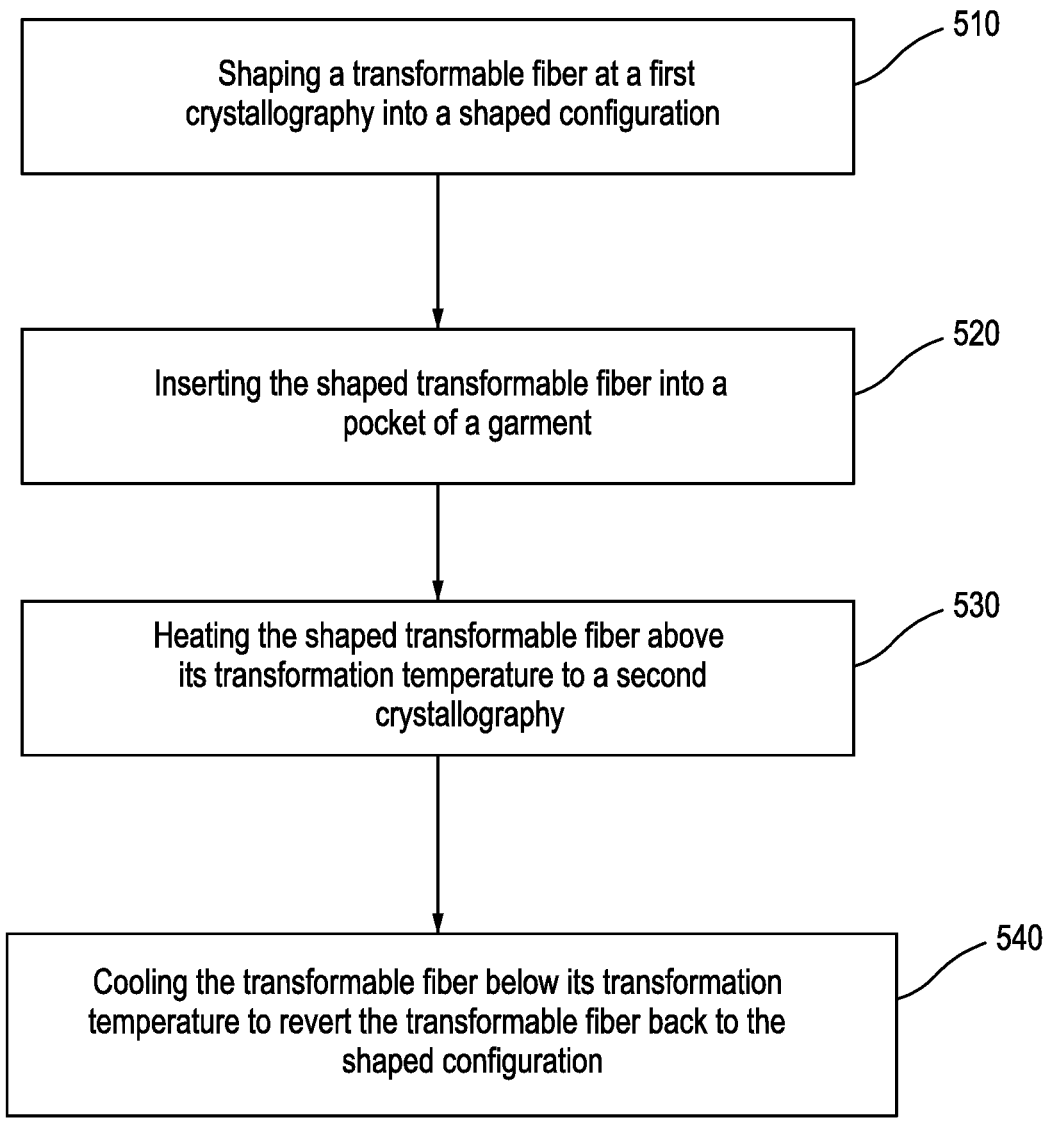
FIG. 5 is a flowchart for a method according to embodiments of the invention.

FIG. 5 is a flowchart for a method according to embodiments of the invention. A transformable fiber at a first crystal structure is shaped from its pre-determined configuration into a new shaped configuration at step 510. In an embodiment, the transformable fiber comprises a nickel titanium alloy, or other material(s) as illustrated in the table of FIG. 3. The first crystal structure may comprise a shape memory phase. In an embodiment, the pre-determined configuration of the transformable fiber comprises a condensed configuration, and the new shaped configuration of the transformable fiber comprises an expanded configuration. The new shaped transformable fiber is inserted into a cavity of a heat and fire protective item in step 520. A plurality of new shaped transformable fibers can also be inserted into an associated plurality of cavities of the fire protective item. In an embodiment, the protective item comprises a firefighter's garment, such as a coverall garment or a head and/or neck covering. In another embodiment, the heat and fire protective item comprises a thermally insulated blanket.

The new shaped configuration of the transformable fiber is heated above its transformation temperature to a second crystal structure in step 530. In an embodiment, the second crystal structure comprises a pseudo-elastic phase. The heating transforms the new shaped configuration to its pre-determined configuration, wherein the pre-determined configuration forms an air pocket within the heat and fire protective item. The transformable fiber is cooled below its transformation temperature to revert the transformable fiber back to the new shaped configuration at the first crystal structure in step 540.

In an embodiment of the invention, the transformable fibers comprise a first crystal structure at a first lower operating temperature and transform to a second crystal structure at a second higher operating temperature, wherein the second higher operating temperature is above a transformation temperature of the transformable fibers. The transformable fibers originally comprise a pre-determined shape (also known as a trained shape) at the first crystal structure. In an embodiment, the first crystal structure comprises a low yield strength crystallography. The transformable fibers can be easily reshaped while still in the first crystal structure. In an embodiment, the first crystal structure is a martensite phase or a shape-memory phase. The transformable fibers will maintain their reshaped configuration as long as they remain below their transformation temperature.

After the transformable fibers are exposed to temperatures above their transformation temperature, the fibers enter into a second crystal structure, in which the reshaped configuration is lost and the fibers revert back to the originally pre-determined shape. The rate at which the configuration transforms back to the originally pre-determined shape is directly proportional to the increase in temperature above the transformation temperature. In an embodiment, the second crystal structure is an austenite phase or a pseudo-elastic phase. When the transformable fibers are cooled down below their transformation temperature, the fibers will transform back to the first crystal structure. The fibers will also return to the reshaped configuration that was formed while the fibers were in the first crystal structure.

Figure 6:
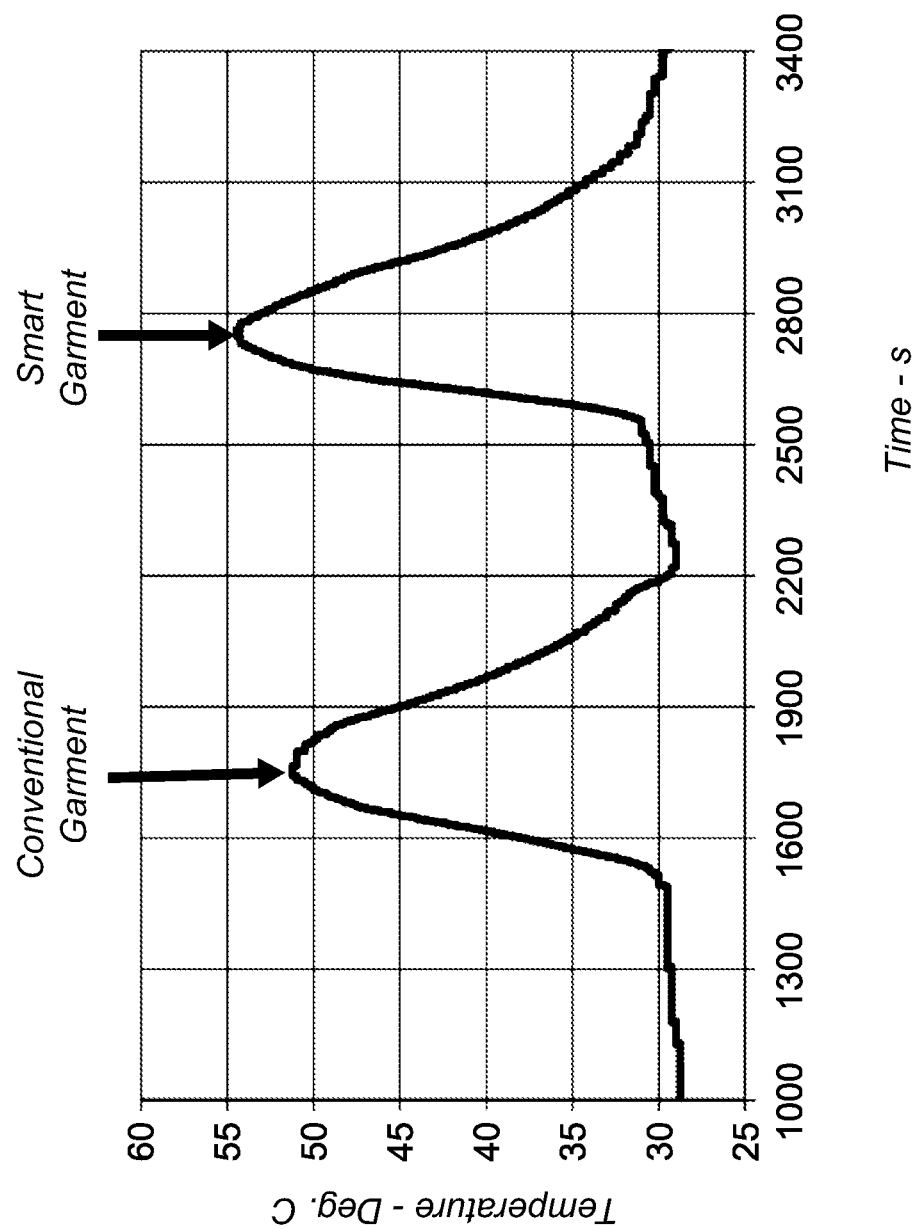
FIGS. 6-8 are illustrations of time versus temperature for a conventional firefighter's garment compared to a firefighter's garment made according to embodiments of the invention.
Figure 7:
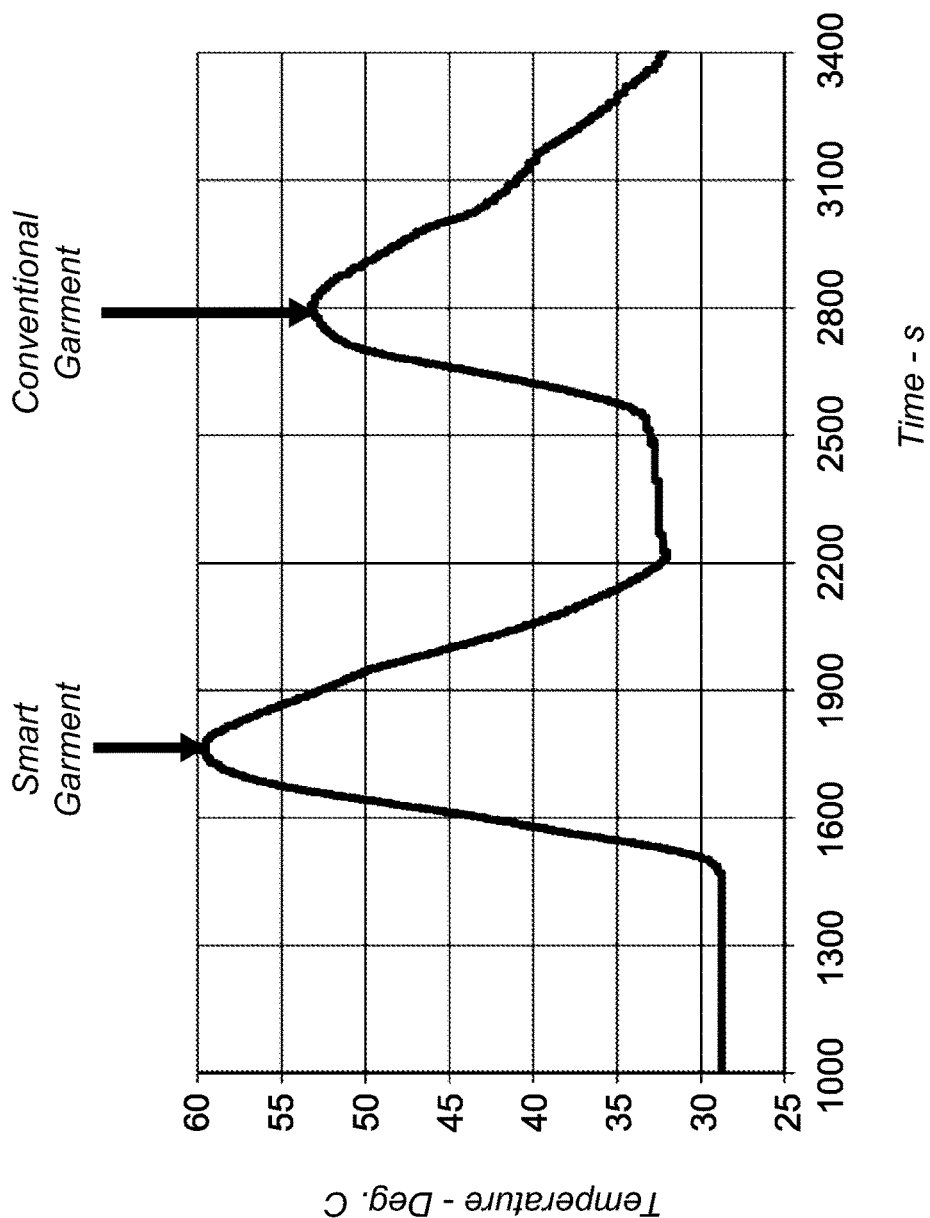
Figure 8:
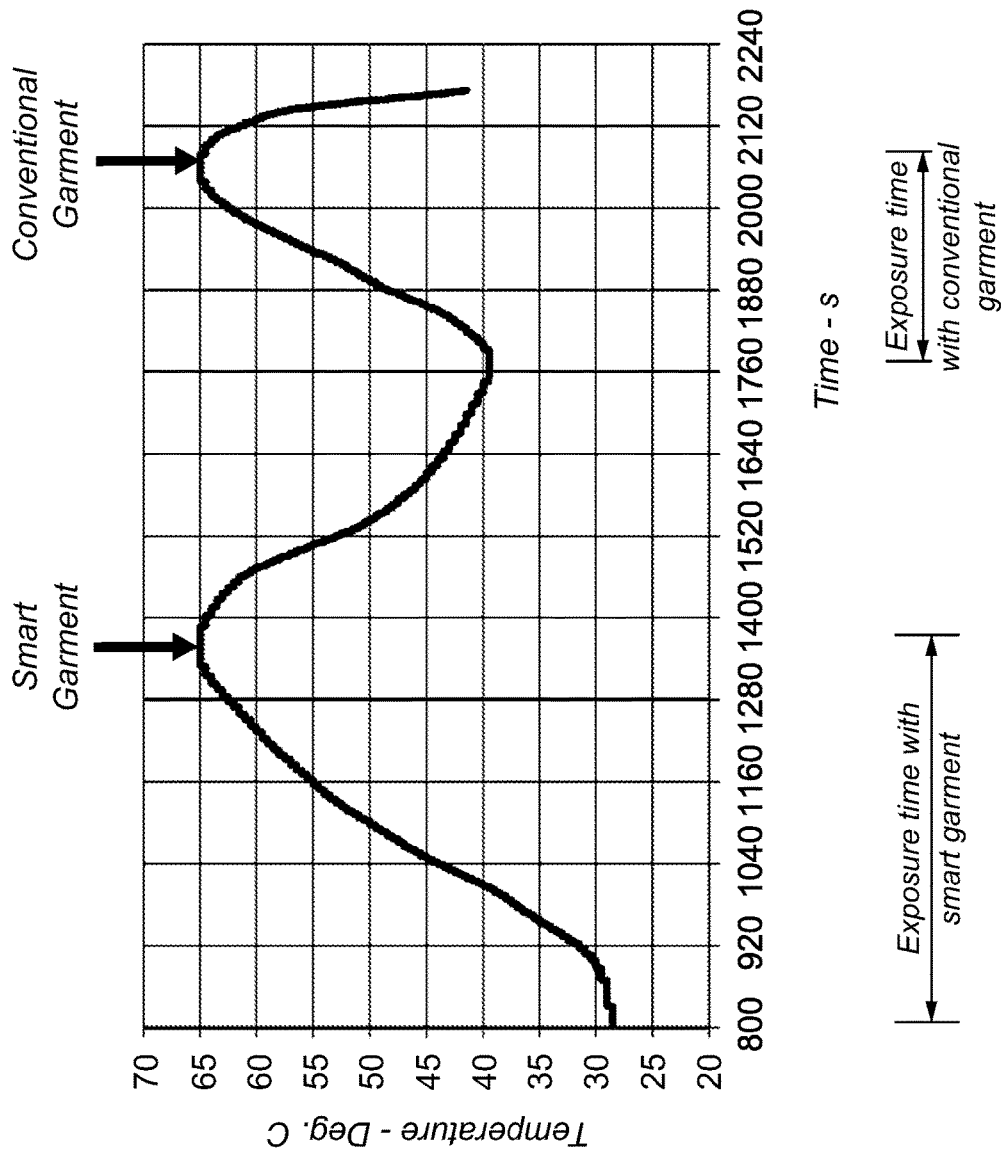

FIGS. 6-8 illustrate the advantages of embodiments of the invention for a heat and fire protective item. The temperatures on the vertical axis of FIGS. 6-8 represent a garment interior temperature as measured between the exterior shell and the interior lining of the garment.

FIG. 6 is an illustration in which a conventional firefighter's garment is compared to a fire protective garment according to embodiments of the invention. The fire protective garment described herein can also be dubbed as a "smart" garment, since the pre-determined shape of the SMFs is remembered, such that the SMFs revert back to the original pre-determined shape when exposed to temperatures above the transformation temperature of the SMFs. As illustrated in FIG. 6, a firefighter was able to withstand higher temperatures after switching to a firefighter's garment made in accordance with embodiments of the invention.

FIG. 7 is a similar illustration, in which the firefighter was able to withstand temperatures of about 60° C. when using a firefighter's garment made in accordance with embodiments of the invention. However, the firefighter was only able to withstand a temperature of about 53° C. when a switch was made to the conventional firefighter's garment.

FIG. 8 illustrates another advantage of embodiments of the invention for a heat and fire protective item. The firefighter was able to withstand exposure to a set high temperature, such as that experienced in a fire fighting role, for a longer period of time using a heat and fire protective garment made according to embodiments of the invention. The exposure time for the same high temperature was nearly two times for the fire protective garment described by embodiments herein, compared to a conventional fire protective garment.

One having ordinary skill in the art will readily understand that the invention as discussed above may be practiced with steps in a different order, and/or with hardware elements in configurations which are different than those which are disclosed. Therefore, although the invention has been described based upon these embodiments described herein, it would be apparent to those of skill in the art that certain modifications, variations, and alternative constructions would be apparent, while remaining within the spirit and scope of the claimed invention. In order to determine the metes and bounds of the invention, therefore, reference should be made to the appended claims.

We claim:
1. A method, comprising:
shaping a first-shaped transformable fiber at a first crystal structure from a pre-determined configuration into a new shaped configuration to provide a second-shaped transformable fiber, wherein the predetermined configuration and the new shaped configuration comprise two arrangements of a snap-ring configuration;
inserting the second-shaped transformable fiber into a cavity of a heat and fire protective item;
heating the second-shaped transformable fiber above its transformation temperature to a second crystal structure to transform the new shaped configuration to the pre-determined configuration, wherein the pre-determined configuration forms an air pocket within the heat and fire protective item; and
cooling the first-shaped transformable fiber below its transformation temperature to revert the transformable fiber back to the new shaped configuration at the first crystal structure.

2. The method of claim 1, wherein the new shaped configuration of the transformable fiber comprises a relatively flat expanded configuration and the pre-determined configuration of the transformable fiber comprises a 3-D condensed configuration.

3. The method of claim 1, wherein the heat and fire protective item comprises a firefighter's garment.

4. The method of claim 1, further comprising: inserting a plurality of transformable fibers into a plurality of cavities situated throughout the heat and fire protective item, wherein each of the plurality of transformable fibers has a same shape as the second-shaped transformable fiber.

5. The method of claim 1, wherein the transformable fiber comprises a nickel titanium alloy.

6. The method of claim 1, wherein the first crystal structure of the transformable fiber comprises a shape memory phase and the second crystal structure of the transformable fiber comprises a pseudo-elastic phase.

* * * * *